Nov. 19, 1946.   W. T. WEBER   2,411,400
SYSTEM FOR DIRECTING THE MOVEMENTS OF AIR AND/OR MARINE CRAFT
Filed July 23, 1943   5 Sheets-Sheet 1

WITNESSES:

INVENTOR:
William Tuttle Weber,
BY
ATTORNEYS.

Nov. 19, 1946.   W. T. WEBER   2,411,400
SYSTEM FOR DIRECTING THE MOVEMENTS OF AIR AND/OR MARINE CRAFT
Filed July 23, 1943   5 Sheets-Sheet 2
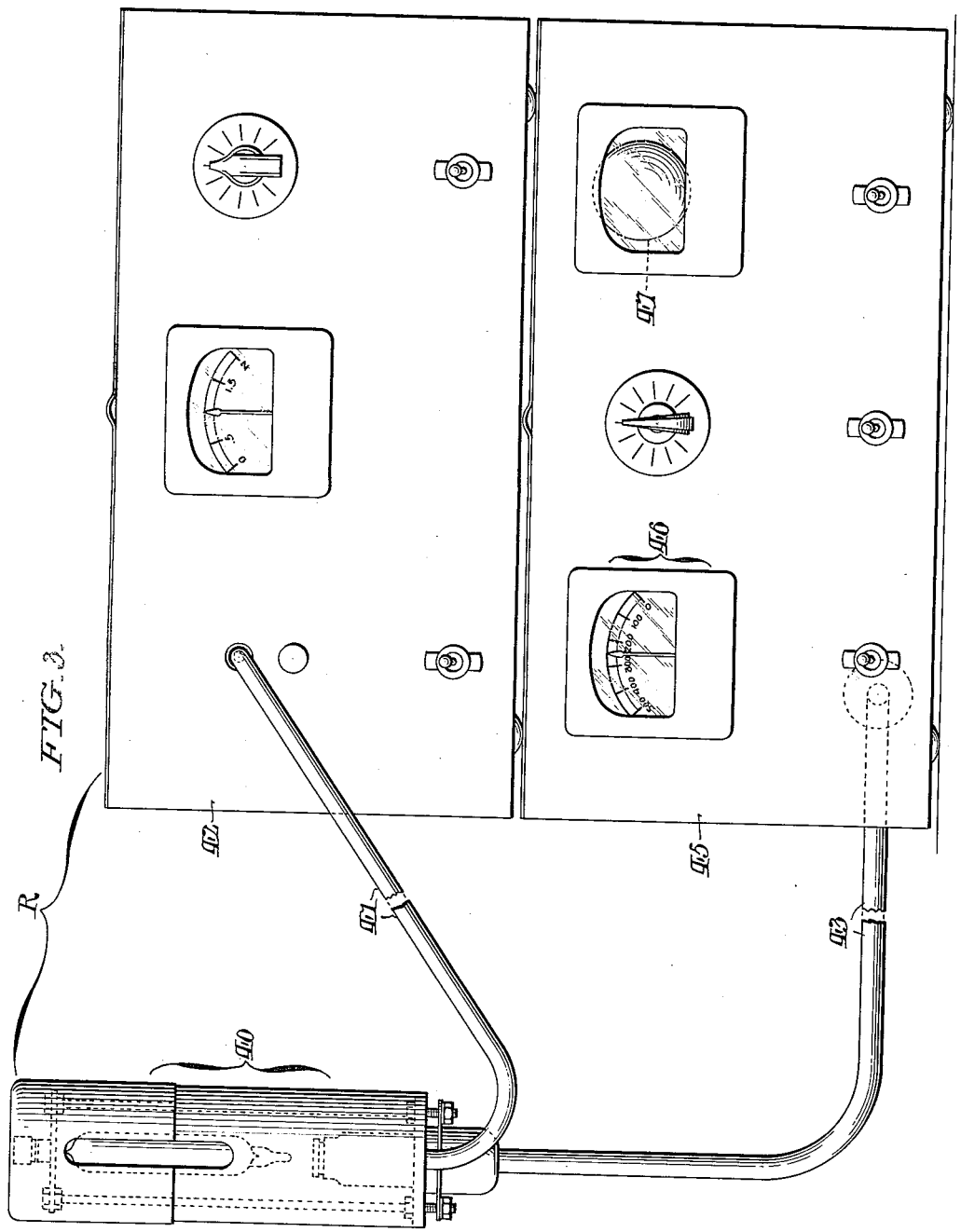

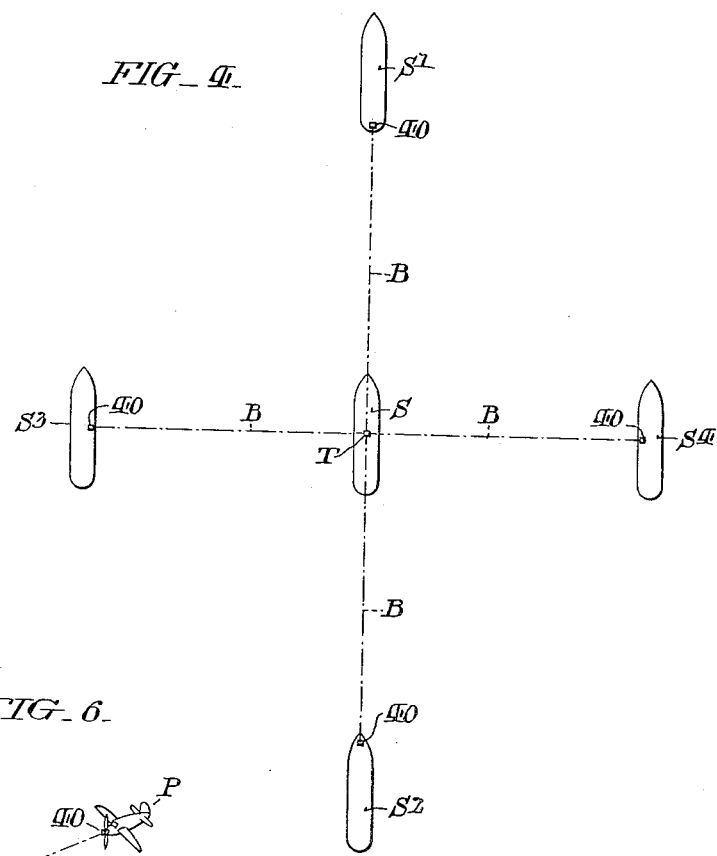
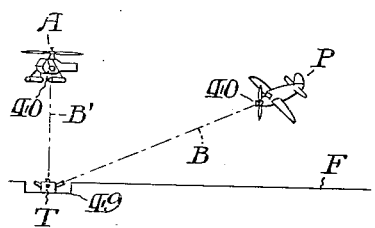
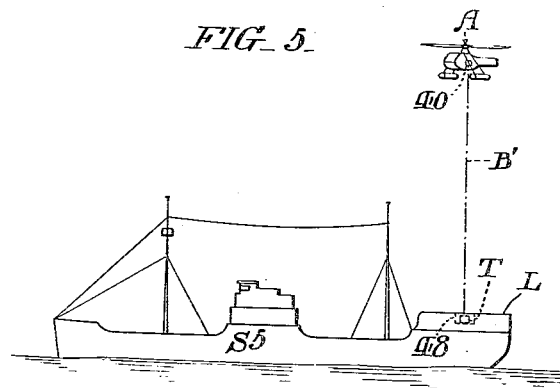

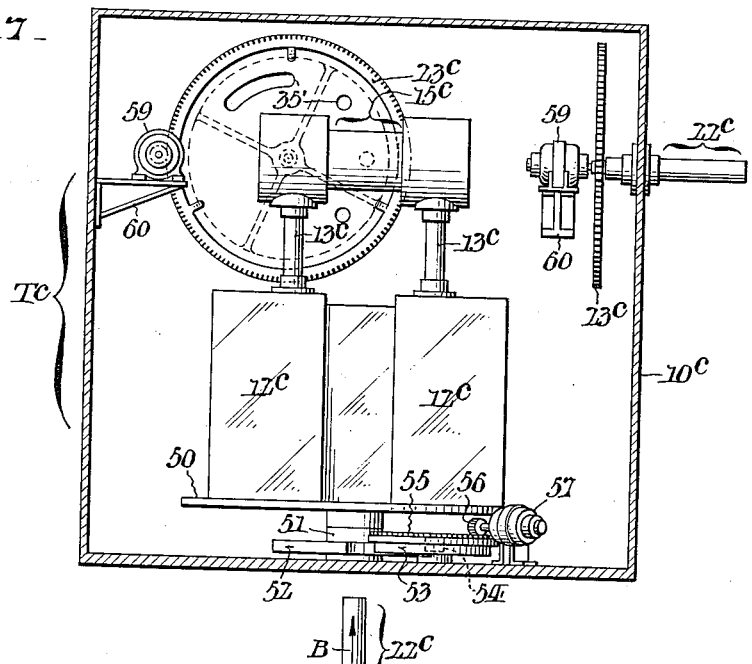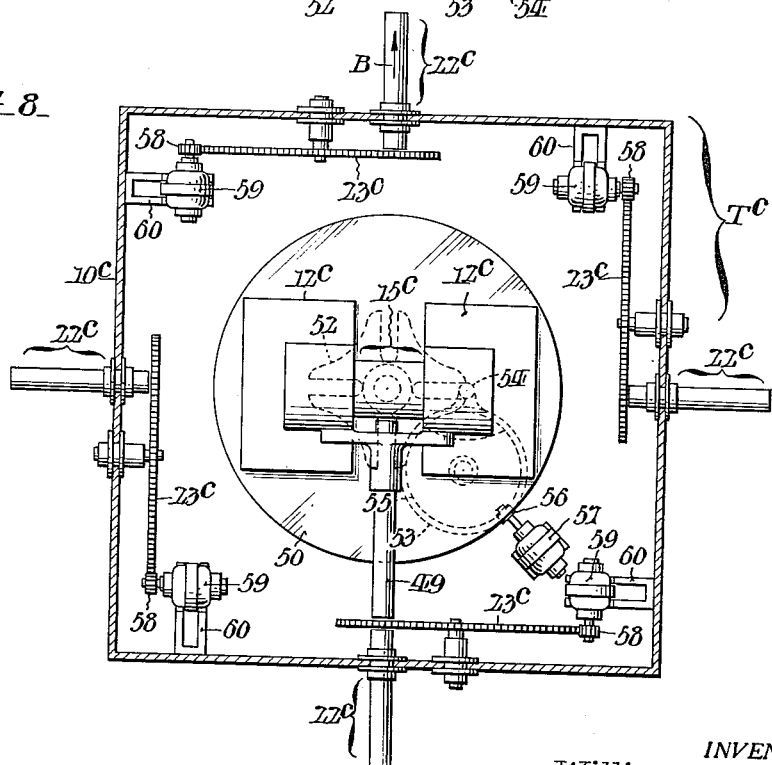

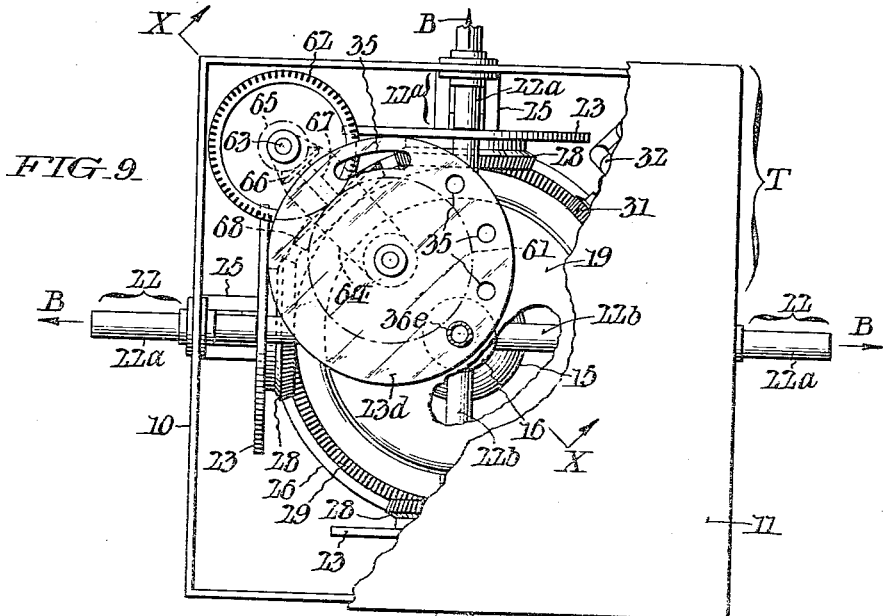
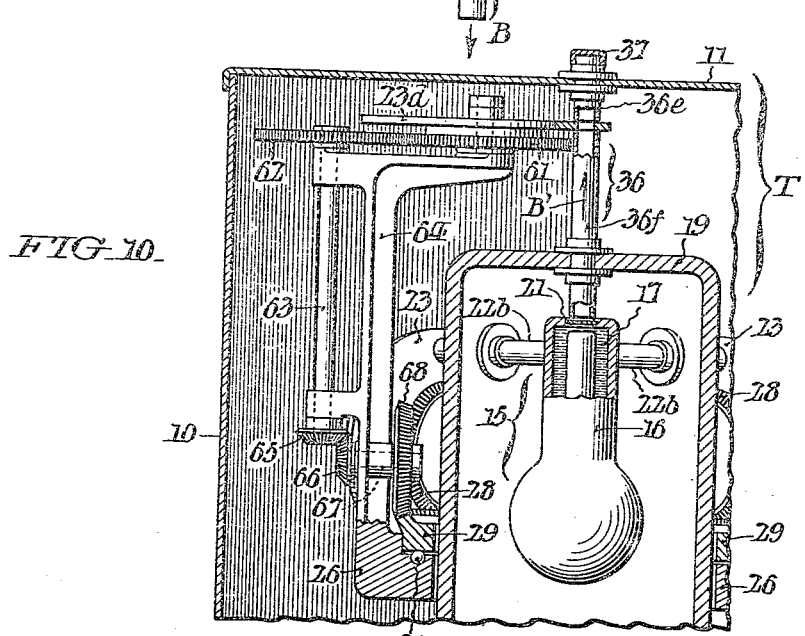

Patented Nov. 19, 1946

2,411,400

UNITED STATES PATENT OFFICE 2,411,400

SYSTEM FOR DIRECTING THE MOVEMENTS OF AIR AND/OR MARINE CRAFT

William Tuttle Weber, Lansdowne, Pa., assignor of one-half to Jacob Applebaum, Philadelphia, Pa.

Application July 23, 1943, Serial No. 495,824

16 Claims. (Cl. 250—11)

This invention relates to systems useful in directing the courses of ships at sea, particularly ships traveling under convoy in wartime, and for directing aircraft into airports or onto the decks of carriers or other vessels.

I am aware that visible light beacons have been employed heretofore in systems of the kind referred to, but such beacons are not readily seen during the day, nor are they reliable in fog; and moreover by reason of their advantage to the enemy in normal or good weather in disclosing the location of the airports and the ships from which the beams are transmitted.

The aim of my invention is to overcome the above mentioned drawbacks, that is to say, to make possible the guiding of ships and the safe landing of aircraft during the night as well as during the day, regardless of cloud or fog conditions.

This desideratum I attain in practice as hereinafter more fully disclosed through the employment of invisible Roentgen or X-rays, or the like, and through provision of improved means for controlling directional transmission of the rays from airports or ships either as continuous beams, or as periodically intercepted code producing beams, for reception by suitable detecting devices on the ships or the aircraft which are to be guided.

Other objects and attendant advantages will appear from the following detailed description of the attached drawings, wherein Fig. 1 is a view in vertical section of a transmitting apparatus conveniently embodying my invention in part and adapted for both marine and land use.

Fig. 3 is a diagrammatic view of detecting apparatus constructed in accordance with my invention and likewise suitable for both marine and land use.

Fig. 4 is a schematic view showing the manner of operation of my improved system in directing the movement of a group of ships under convoy.

Fig. 5 is a diagrammatic view showing the use of the system in guiding an aircraft to the landing deck of a ship.

Fig. 6 is a view similar to Fig. 5 illustrating the use of the system in guiding aircraft to a landing field of an airport.

Figs. 7 and 8 are views corresponding to Figs. 1 and 2 showing an alternative form of transmitting apparatus.

Fig. 9 is a view also like Fig. 2 illustrating a modification of the transmitting apparatus; and Fig. 10 is a fragmentary sectional view taken as indicated by the angled arrows X—X in Fig. 9.

Figure 1:
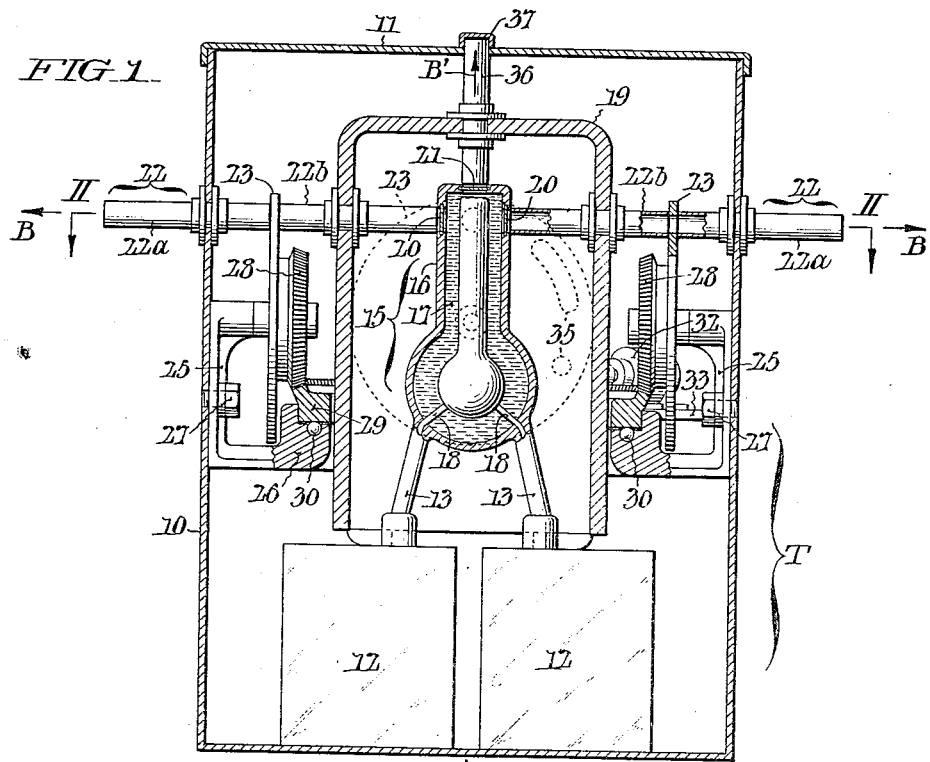
Figure 2:
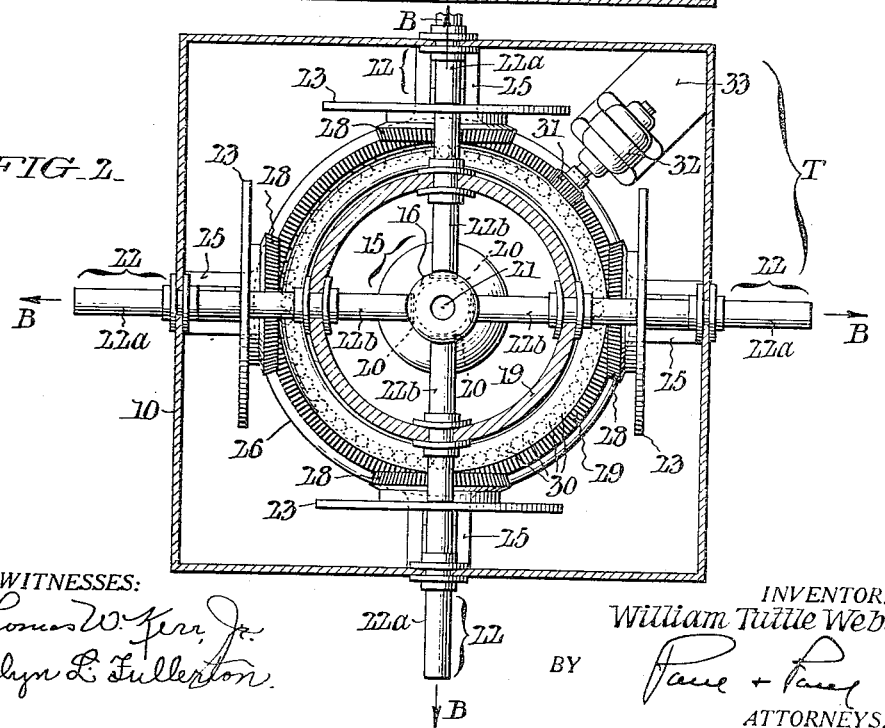
Fig. 2 is a plan section of the apparatus taken as indicated by the angled arrows II—II in Fig. 1.

With more detailed reference first more especially to Figs. 1 and 2 of these illustrations, the transmitting apparatus there delineated and generally designated by the letter T has a box-like housing 10 which is preferably of iron with a lining or coating of lead, and which is provided with a removable lid 11 of like material so that when necessary access may be had to the parts about to be described at its interior. Suitably fixed in position in the lower portion of the housing 10 is a pair of transformers 12; and supported atop these transformers in the vertical axis of the housing by struts 13, is a Roentgen or X-ray generator 15 of which the bulb is surrounded by a sheathing 16 of lead with provision of a jacket 17 for circulation thereabout of oil or other cooling fluid. The generator 15 is more or less diagrammatically exemplified as being one of a new, recently developed type capable of emitting its rays in all directions, said tube being supplied with current at high voltage through leads 18 extending down through the struts 13 for connection in circuit with the transformers 12 in a well known manner. The generator 15, as a whole, is disposed within a shielding shell 19 having walls of relatively thick lead, said shell resting on top of the transformers 12 and being open at the bottom as best seen in Fig. 1. In adapting the generator 15 to the purposes of my invention, I form the upper cylindric portion of its sheathing 16 with a plurality of windows 20. In the illustrated instance there are four of such windows 20 circumferentially spaced at a quadrant and facing the four walls of the housing 10. There is also provided, for a purpose later on explained, a similar window 21 axially of the top of the sheathing 16. Aligned with the lateral windows 20 of the sheathing 16 are beam emission tubes 22 each such tube being formed in two coaxially-arranged sections 22a, 22b which are suitably secured in the side walls respectively of the housing 10 and the shell 19, and which are separated by an interval for projection therebetween of the edge portion of a disk 23. The four disks 23 are supported for rotation about horizontal axes by radial arms 25 of an annular frame 26 which is secured by screw bolts 27 whereof the threaded shanks pass through apertures in said arms and take into the side walls of the housing 10. Affixed to each disk 23 is a bevel gear 28 in mesh with a bevel gear ring 29 which revolves in a recess in the annulus 26 and which is supported on bearing balls 30. In the use of the apparatus, the bevel gear ring 29 is constantly driven by an intermeshing bevel pinion 31 on the shaft of an electric motor 32 mounted on a bracket 33 in one corner of the housing 10. As instanced in dotted lines in Fig. 1, each disk 23 is formed with a series of perforations 35 adapted as the disk revolves to pass the corresponding window 20 in the sheathing 16 of the X-ray bulb. The apertures 35 may be in the form of circular holes or elongate slots, or combinations of the two to produce periodic flashes of the beam B for the purposes of code signaling. The perforations of the disks 23 may be identical throughout or they may differ, depending on the character of the code messages which are to be transmitted. Aligned with the upper window 21 in the sheathing 16 of the X-ray bulb is a tube 36 which is fixed in the top wall of the shell 19 and which passes out through an opening in the lid 11 of the casing 10, being itself provided with a removable cover 37 which is of course removed when the vertical beam B' is to be used.

For detection of the X-ray beams or code signals transmitted from the apparatus T of Figs. 1 and 2, I have devised the receiving apparatus pictured in Fig. 3 and generally designated by the letter R. As shown, this receiving apparatus includes a bulb device generally indicated by the numeral 40 which is sensitive to X-rays and which is commercially known as a "Geiger" counter. The power input cable 41 of the device 40 is connected to a power pack which may be of any approved commercial type and which is herein represented by its casing 42. The output cable 43 of the device 40 is, on the other hand, connected to an electronic amplifier, which, like the power pack, may be of any approved type, said amplifier being herein likewise represented by its casing 45. In accordance with my invention, the dial of the milli-ammeter 46 of the amplifier (which meter, let it be understood, is of the damped or ballistic type capable of registering continuously) is calibrated to indicate distances in feet rather than current strength as ordinarily. The amplifier is moreover shown as having a light bulb 47 for visibly indicating the signals received, and, if desired, an electric bell or other audible signal means may be connected in circuit with the light bulb for synchronous operation therewith.

When employed to transmit signal beams to control the movements of a group of convoyed ships the transmitting apparatus T is mounted as shown in Fig. 4, at a suitable point on a master ship S, amongst a group of convoyed ships S', S2, S3 and S4, so that the beams B are flashed forward and rearward and sidewise to said convoyed ships as indicated by the dot-and-dash lines. The transmitter may be located at any convenient location on the ship S. Each of the ships S'—S4 is provided at a convenient location with a receiver 40 for detection of the beam or code messages transmitted from the master ship S. The receiver 40 may be mounted with capacity for being turned about its vertical axis, about half way up a mast of each of the convoyed ships with the slot of its bulb device facing the master ship S and the other parts of the receiving apparatus located on the bridge or in a cabin set apart for them as may be found convenient or desirable. With the aid of the meter 46 of the receiving apparatus, it will be seen that each convoyed ship can be maintained at a definite distance from the master ship not only during the day but at night and in spite of cloudy or foggy weather conditions. By turning the receiver 40 it will be possible to find the beam intended for it if the convoyed ship should stray from the desired course in a manner which will be readily understood from Fig. 4.

Fig. 5 illustrates how the vertical beam from the transmitter T of my invention is utilized to direct an autogyro A to a landing deck L of a ship S5. In this case the transmitter is recessed into the deck L as at 48, and the receiver 40 located at the bottom of the fuselage of the autogyro.

In Fig. 6 the system is shown arranged for directing ordinary planes and autogyros to a landing field of an airport. Here the transmitting apparatus T is recessed at 49 into the surface F of the airport, said apparatus being like that illustrated in detail in Figs. 1 and 2 except for having its tubes 22 arranged to angularly direct the beams B for guidance of ordinary plane P, while its vertical beam B' is used for directing the autogyro A. In the case of the ordinary plane P the receiver 40 may be placed in the noses of the fuselages, and in the case of autogyros in the bottoms of the fuselages as indicated.

In the alternative form of transmitting apparatus T' illustrated in Figs. 7 and 8, a Roentgen tube 15c is of the ordinary type which transmits its rays only in the direction indicated by the arrow in Fig. 8. In this instance the transformers 12c and the tube 15c are supported upon a turntable 50 which is suitably journaled for rotation in a bearing 51 at the bottom of the housing 10c, and which is arranged to be intermittently rotated through a quadrant at each actuation by a "Geneva" movement whereof the star wheel is designated 52 and the cooperative disk 53 which carries the drive pin 54. Connected to the disk 53 is a bevel gear 55 (see Fig. 7) which is in turn driven by a bevel gear pinion 56 on an electric motor 57 fixedly supported within the housing 10c. Incident to the dwells between the intermittent rotary shifts of the table 50, the rays emitted from the generator are directed into a confining tube 49 supported on said table and successively through the tubes 22c, which, as in the first described embodiment, are suitably secured in the side walls of the housing 10c, the rays being intercepted in each instance by a perforated disk 23c in the same manner as described in connection with the first embodiment. Here, however, the disks 23c are formed with peripheral teeth which mate with drive pinions 58 on the shafts of individual electric motors 59 supported by brackets 60 from the walls of the housing 10c.

The modified transmitter illustrated in Figs. 9 and 10 is identical with that shown in Figs. 1 and 2 except that here a separate coding disk 23d is provided to periodically intercept the vertically directed beam. The disk 23d is rotated through the medium of auxiliary drive means which includes a pair of intermeshing spur gears 61 and 62 whereof the first is affixed to said disk and the other to the upper end of a vertical shaft 63. As shown, the shaft 63 is journaled in an upward bracket extension 64 of the annulus 26 at one corner of the housing 10, which bracket also rotatively supports the disk 23d. To the lower end of the shaft 63 is secured a miter pinion 65 that mates with a similar miter pinion 66 on the outer end of a short horizontal shaft 67 also journaled in the bracket extension 64 and provided at its inner end with a bevel gear 68 that meshes with the gear ring 29. The propor ing of the gears 61, 62, 65, 66 and 68 in the illustrated instance is such that the disk 23d is rotated at the same speed as the disks 23. However, if found to be desirable it may be otherwise proportioned for rotation of the disk 23d at a differential speed. As further shown, the edge portion of the disk 23d extends into an interval in the directing tube 36d which, like the tubes 22, is made in two sections 36e and 36f.

Having thus described my invention, I claim:

1. In a system of the character described, a transmitter for emitting a directional X-ray beam from a ship or a landing port; an X-ray detector for carriage on another ship or on an air craft to be guided; and means influenced by the output from said detector to directly indicate the distance of the latter from said transmitter.

2. The invention according to claim 1, further including means embodied in the transmitter for periodically intercepting the beam to produce code signals; and means associated with the detector for visibly indicating the code signals.

3. The invention according to claim 1, further including means embodied in the transmitter for periodically intercepting the beam to produce code signals; and means associated with the detector for visibly and audibly indicating the code signals.

4. In a system of the character described for directing the course of ships in convoy, a transmitter carried by a master ship amid the convoy group and adapted to emit directional X-ray beams laterally in several different directions; and X-ray detectors carried respectively by the other ships in the group, each such detector having associated with it means for directly indicating the distance between the corresponding ship and said master ship.

5. The invention according to claim 4, wherein the transmitter on the master ship embodies means for periodically intercepting the beams to produce code signals; and wherein the detector on each of the other ships embodies means for visibly indicating the code signals received.

6. The invention according to claim 4, wherein the transmitter on the master ship embodies means for periodically intercepting the beams to produce code signals; and wherein the detector on each of the other ships embodies means for visibly and audibly indicating the code signals received.

7. The invention according to claim 4, wherein the transmitter also emits a directional beam vertically for guidance of aircraft to a landing deck on the master ship.

8. A transmitter for a system of the character described including a bulb capable of emitting X-rays in all directions, a sourrounding casing with a plurality of circumferentially-arranged windows, and means confining the beams emanating from said windows for directional projection.

9. A transmitter according to claim 8, including means for periodically intercepting the projected beams to produce code signals.

10. A transmitter according to claim 8, wherein the confining means are in the form of radial tubes respectively in line with the windows.

11. A transmitter according to claim 8, wherein the confining means are in the form of radial tubes respectively in line with the windows; and further including perforated screening means to pass through interruptions in the tubes and thereby periodically intercept the beams for the purpose of producing code signals.

12. A transmitter according to claim 8, wherein the confining means are in the form of radial tubes respectively in line with the windows; further including rotary disks with perforated edge portions projecting into interruptions in the respective tubes; and means for rotating the disks to cause periodic interception of the beams for the purpose of producing code signals.

13. A transmitter according to claim 8, wherein the confining means are in the form of radial tubes respectively in line with the windows; further including rotary disks with perforated edge portions projecting into interruptions in the respective tubes; and means for rotating the disks to cause periodic interception of the beams for the purpose of producing code signals, the last mentioned means comprising gear wheels in individual fixed relation to the disks, an intermeshing master gear wheel, and a motor for driving the master gear wheel.

14. A transmitter according to claim 8, wherein the casing for the bulb is provided with a window at the top; and means for confining the additional beam emanating from the last mentioned window for vertical projection.

15. A transmitter for a system of the character described including a bulb which emits an X-ray beam laterally; a surrounding protective housing with means at intervals perimetrically thereof to confine the beam for directional projection; and means for intermittently rotating the bulb through partial turns to vary its beam into line successively with the individual confining means.

16. A transmitter according to claim 15, further including means for periodically intercepting the beam at each dwell in the rotation of the bulb for the purpose of producing code signals.

WILLIAM TUTTLE WEBER.